United States Patent [19]
Bieser et al.

[11] Patent Number: 6,159,506
[45] Date of Patent: Dec. 12, 2000

[54] METHOD FOR SELF-REGULATING STRESS-REDUCTION USING FOLIC ACID ENRICHED DIETARY SUPPLEMENT COMPOSITIONS

[76] Inventors: Albert Howard Bieser, 15535 St. Cloud, Houston, Tex. 77062; Lary Allen Dorrington, 16707 Ivy Grove, Houston, Tex. 77058

[21] Appl. No.: 09/298,285

[22] Filed: Apr. 23, 1999

Related U.S. Application Data

[62] Division of application No. 08/909,421, Aug. 11, 1997, Pat. No. 5,922,361.
[51] Int. Cl.$^7$ .......................... A61K 33/06; A61K 31/495; A61K 31/44; A61K 31/195
[52] U.S. Cl. ........................... 424/682; 514/188; 514/249; 514/561
[58] Field of Search ...................................... 514/188, 249, 514/561; 424/682

[56] References Cited

U.S. PATENT DOCUMENTS

| | | | |
|---|---|---|---|
| 4,312,857 | 1/1982 | Coy et al. | 424/177 |
| 4,439,452 | 3/1984 | Ehrenpreis et al. | 424/319 |
| 4,619,923 | 10/1986 | Kappas et al. | 514/185 |
| 4,761,429 | 8/1988 | Blum et al. | 514/561 |
| 5,189,064 | 2/1993 | Blum | 514/561 |
| 5,326,569 | 7/1994 | Acosta et al. | 424/440 |
| 5,587,399 | 12/1996 | Acosta et al. | 514/561 |

FOREIGN PATENT DOCUMENTS 229 931  9/1984  Germany ........................ A61K 31/19

OTHER PUBLICATIONS

Nancy Andersen, The Broken Brain, Harper & Row, Publishers, pp. 180–183, 1985.
Wall Street Journal, by Robert Langreth, Science Yields Powerful Therapies for Pain, pp. B1, B4, Aug. 1996.

*Primary Examiner*—Raymond Henley, III
*Attorney, Agent, or Firm*—Harrison & Egbert

[57] ABSTRACT

A food supplement compositions combining suitable precursor substrates with folic acid, whereby methionine is produced in sufficient quantity to produce a sufficient quantity of met-enkephalin specially formulated for coping with stressful assaults upon the human body. By a coenzymatic mechanism folic acid effectively accelerates the transformation of a substrate primarily comprising DL-phenylalanine, L-phenylalanine, L-glutamine, and L-tryptophan to met-enkephalin end product. Use of this food supplement enables enkephalins to accumulate within the human hypothalamus, thereby increasing the levels of endogenous opioids. By increasing endogenous opioid levels, the human body is engendered with a self-regulating faculty for coping with stressful assaults upon physiological and psychological equilibrium. A methodology for supplementing the nutritional intake of certain neurotransmitter precursor substrates, wherein patients of all ages may routinely quell continuous stressful attacks upon their normal physiological and psychological functioning.

3 Claims, 2 Drawing Sheets

METHOD FOR SELF-REGULATING STRESS-REDUCTION USING FOLIC ACID ENRICHED DIETARY SUPPLEMENT COMPOSITIONS

RELATED APPLICATIONS

The application is a divisional of U.S. application Ser. No. 08/909,421 Aug. 11, 1997, now U.S. Pat. No. 5,922,361.

BACKGROUND OF THE INVENTION

This invention relates to dietary supplement compositions, and more particularly relates to dietary supplement compositions which promote the ability of the human body to engender calmative conditions when subjected to exigent, stressful stimuli and the like.

Stress has become an integral part of virtually all modern lifestyles. From personal problems to family problems to job pressures to delays caused by traffic jams and long runway queues at airports, the human body is constantly summoned to entertain stressful assaults upon its normal equilibrium. It is now well understood that, when subjected to such stress, the human body undergoes certain physiological changes to accommodate the consequent perturbations.

To cope with continual or extreme stressful circumstances, priority is automatically given to its responsive, defensive systems. Concomitantly, body functions which serve no purpose pertaining to such exigent conditions, such as digestion, decrease or are held in abeyance. While the human body is striving to overcome stressful assaults and the like, unfortunately, increased heart rate, circulation, oxygen supply, and metabolism frequently occur.

Such defensive systems include the adrenal glands which are well known to modulate the body's capability to respond to stress by producing cortisol. It is also well known that the functioning of the adrenal glands is controlled by the brain. Thus, reacting to an incidence of a stressful assault upon the body, the brain triggers from the adrenal glands release of epinephrine and ACTH hormones from the adrenal medulla and cortex for entry into the bloodstream. As physiological changes during this response to stress, resistance and cortisone secretion increase, the body seeks to sustain homeostasis. As elevated levels of cortisol and the like strongly affect the circulatory, digestive, and immune systems, the body's defenses ultimately become fatigued and then become susceptible to infection and disease.

It will be appreciated by those skilled in the art that the manner in which the human body reacts to stress is a function of endogenous and exogenous factors. Endogenous factors include genetic constitution, familial disease history, proclivity toward disease, and innate organ viability. Exogenous factors include physical condition of the human body, and environmental social, intellectual, and psychological conditions.

Of course, it is well known that being subjected to periods of protracted stress has been found to cause the human body to suffer from adverse physical and psychological affects. Indeed, stress has been implicated in the incidence of heart disease, hypertension, migraine headaches, ulcers, and depression. While it will be understood by those skilled in the art that each human body reacts somewhat differently to insults from stress, the changes that generally occur are similar. For example, it is now known that while responding to stress, the human body suffers from a depletion of neuroregulators from the endogenous opioid system, gamma-aminobutyric acid ("GABA") system, and serotonin system. As another example, there have been many studies that have shown that the hypothalamus and hippocampus neurotransmitters dopamine, enkephalin, GABA, norepinephrine, and serotonin have important effects upon emotional response.

As is understood by those skilled in the art, neuroregulators are chemicals that enable messages to be transmitted among nerve cells located in the brain. Each of the several neuroregulators found in the brain correspond to a specific receptor site located throughout the human body. Such neuroregulators may be either neurotransmitters that act through synaptic transmission or neuromodulators that act through mechanisms other than synaptic transmission. For instance, responsive to stress, B-endorphin has been observed in the art to be secreted concomitantly with ACTH. Similarly, leu-enkaphalin has been observed to function as a neurotransmitter in the area of the brain involved with reward and sense of euphoria. As will be understood by those conversant in the art, endorphins, enkaphalins, and kappa antagonists comprise endogenous opioids which are intertwined with the body's ability to cope with stress and other threats to its equilibrium.

Endorphins are relatively large molecules that contain small, active painkilling chemicals called enkephalins. Two widely studied enkephalins are pentapeptides called leu-enkephalin containing a five amino acid string and leucine, and met-enkephalin containing methionine. Leu-enkephalin may be shown with the simplified sequence:

H-Tyrosine-Glycine-Glycine-Phenylalanine-Leucine-OH and met-enkephalin may be shown with the simplified sequence:

H-Tyrosine-Glycine-Glycine-Phenylalanine-Methionine-OH.

U.S. Pat. No. 4,439,452 teaches that enkephalins have the ability to act as analgesics when administered to various animals and humans by certain special procedures, including intracerebral injections. Only limited results have been obtained from oral administration of enkephalins, however, attributable to the destruction of the enkephalins by the action of certain enzymes which resemble carboxypeptidase. These and other enzymes which tend to inactivate enkephalin are known collectively as enkephalinase.

As will be understood by those skilled in the art, enkephalinase has been found to cleave the met-enkephalin molecule at the indicated ("*") points in the sequence:

H-Tyrosine*Glycine*Glycine*Phenylalanine-Methionine-OH

This cleavage eliminates or minimizes the painkilling effects of the enkephalin molecule. Blum in U.S. Pat. No. 4,761,429, teaches a composition intended to inhibit this action of enkephalinase and endorphinase. Such an enkephalinase inhibitor is a substance which inhibits the destruction of neuropeptides and endorphins in the animal body. More particularly, D-phenylalanine or hydrocinnamic acid (including DL-phenylalanine (DLPA) and D-amino acids) was discovered by Blum to be an enkephalinase inhibitor in a daily dosage range of 32 to 10000 mg. The technique taught therein enables endorphins to be accumulated in regions of the nervous system for being readily dispatched into the bloodstream when stressful conditions arise.

A related development in the art is disclosed also by Blum in U.S. Pat. No. 5,189,064 wherein compositions comprising an endorphinase or enkephalinase inhibitor and optionally a suitable precursor promote restoration of normal neurotransmitter function, with no addiction side-effects.

The optional precursor component may be selected from either a dopamine precursor or a serontonin precursor, a GABA precursor or an endorphinase or enkephalinase precursor. Accordingly, those skilled in the art comprehend the potential benefits to be derived from the interaction of neurotransmitters such as dopamine, GABA, serontonin, and norepinephrine with opioid peptides such as endorphins and enkaphalins. Indeed, it should be evident that compositions premised upon such ingredients as d- and 1-phenyalanine and 1-glutamine are likely to be applicable in treatment protocols to reduce drug addiction and the like.

To help understand the mechanisms used by the human body to contend with challenges to normal emotional snd ingestive behavior, a "reward cascade" model has been suggested. See K. Blum, M. C. Trachtenberg, and G. P. Kozlowski, "Cocaine Therapy: The 'Reward Cascade' Link," Professional Counselor, January/February 1989 p.27. This model describes normal stimulations as originating in the hypothalamus and comprising a chain of events wherein: neurons in the hypothalamus release serotonin; serotonin activates the opioid peptide methionine enkephalin; methionine enkephalin is released at the substantia nigra and interacts to inhibit receptors controlling neuronal release of GABA; since the primary function of GABA is believed to be to control dopamine output in the ventral tegmental region, increased supply of dopamine is a by-product of inhibiting GABA activity; dopamine thus released acts as the target messenger of reward; and cells originating in the locus coeruleus and projecting to the hippothalamus release norepinephrine. According to this model, when in equilibrium, the cascade of events provides homeostatic regulation of the extent of activity. On the other hand, if a neurotransmitter or neuromodulator either becomes dysfunctional or its corresponding receptor site becomes nonresponsive, there is perturbation to equilibrium causing a modification of feelings and/or behavior.

As schematically depicted in FIG. 1, another preferred approach is to view these interdependent events as occurring in cycles rather than in series. More particularly, there is shown how the human body's response to continuing stress can form an unstable feedback loop in the systems within the hypothalamus, thereby causing continual release of superfluous adrenalin. Stressful assaults upon the human body cause opioid levels to diminish, causing a sense of urgency. These lowered opioid levels cause not only dopamine levels to increase, but also GABA levels to decrease, engendering a combination of anxiety and alertness. As will understood by those skilled in the art, lowering of GABA levels causes norepinephrine levels to increase and serotonin levels to decrease. Adrenalin is released due to the increased norepinephrine, which also effectuates a quick, emotional response and discourages slower, deliberate logical thinking. Sleep difficulties also flow from the decreased serotonin. Of course, increased adrenalin causes the heartbeat to accelerate and also causes red corpuscle reserves to enter the bloodstream. Thus, as is well known in the art, this adrenalin release causes energy and nutrient resources to be diverted from functional organs, such as the liver and the digestive tract, to the muscles, whereupon the body is bestowed with abnormal physical strength, in response to stressful threats. As is also clearly shown, the decreased serotonin feedback loop further modulates the opioids downward. Accordingly, the sleep cycle is apt to repeat with increasing intensity, causing further perturbing the normal equilibrium. Absent a means and method of quelling this neurochemical imbalance, the human body will lose control of its physiological and psychological faculties.

Although useful for treating craving disorders including cocaine addiction and the like, the approaches taught by the Blum compositions and methodology are limited to applying nutritional supplements on pro re nata basis, i.e., p.r.n. Heretofore unknown in the art is a dietary supplement which provides the benefits of the teachings of Blum for mitigating the adverse affects of the human body being regularly subjected to stressful assaults, but on a self-regulating basis wherein a sufficient repository of neurotransmitters and the like is generally available for assuaging perturbations from normal physiological and psychological functions. That is, unlike a formal treatment program for alcohol or drug abuse under which medication or supplements are prescribed as needed on a patient-by-patient basis, it would be advantageous to have available a daily dosage of a food supplement that provides a means for routinely attenuating stressful threats inflicting potential "victims" of modern society's omnipresent stressful conditions, and thereby avoiding organ damage and other impairment of normal physiological and psychological functions.

Accordingly, these limitations and disadvantages of the prior art are overcome with the present invention, wherein improved compositions are provided which are particularly useful for enabling stressful assaults upon the human body to be normalized without the necessity for prescribing medication or for providing food supplements on a p.r.n. basis.

SUMMARY OF THE INVENTION

The present invention provides food supplement compositions specially formulated for coping with stressful assaults upon the human body. More particularly, compositions taught by the present invention combine suitable precursor substrates and the like with folic acid, whereby methionine is produced in sufficient quantity to, in turn, produce a sufficient quantity of met-enkephalin. As will be appreciated by those conversant with the art, this met-enkephalin enables enkephalins to accumulate within the human hypothalamus, thereby increasing the levels of endogenous opioids. As will hereinafter be described in detail, it will also be appreciated that by thus increasing endogenous opioid levels, the human body is engendered with a self-regulating faculty for coping with stressful assaults upon physiological and psychological equilibrium.

It has been discovered that by a coenzymatic mechanism folic acid effectively accelerates the transformation of a substrate primarily comprising DL-phenylalanine, L-phenylalanine, L-glutamine, and L-tryptophan to met-enkephalin end product. For enabling the human body to self-regulate its defenses to continual stressful assaults, the present invention provides the hypothalamus with a means for preventing significant perturbation or instability to feedback loops associated with dopamine production (see FIG. 1) by assuring sufficiently increased levels of endogenous opioids.

According to the teachings of the present invention, a methodology has been discovered which, by supplementing the nutritional intake of certain neurotransmitter precursor substrates, patients of all ages may be equipped to routinely quell continuous stressful attacks upon their normal physiological and psychological functioning.

As will be hereinafter described in detail, it is accordingly an object of the present invention to provide food supplements and a concomitant methodology for enabling the human body to self-regulate its ability to quell perturbations to its equilibrium due to stressful assaults.

It is also an object of the present invention to provide food supplement compositions for providing the human body sufficient resources for avoiding unstable physiological and psychological effects attributable to effects of the stress cycle.

It is also an object of the present invention to provide food supplement compositions comprising surprisingly low quantities of suitable neurotransmitter precursor substrate.

It is another object of the present invention to provide food supplement compositions produced from neurotransmitter precursor substrate using a folic acid coenzyme.

It is yet another object of the present invention to provide food supplement compositions which enable the human body to produce sufficient quantities of methionine for producing sufficient quantities of met-enkaphalins to accumulate in the hypothalamus, thereby increasing the quantity of available endogenous opioids.

It is a further object of the present invention to provide a method for eliminating adverse effects upon the human body's systems caused by homocysteine, by promoting the conversion of L-homocysteine to L-methionine.

It is a feature and advantage of the present invention that, due to combined physical and chemical effects heretofore unknown in the art.

These and other objects and features of the present invention will become apparent from the following detailed description, wherein reference is made to illustrative examples and related tables and to the figures in the accompanying drawings.

DETAILED DESCRIPTION

Figure 1:
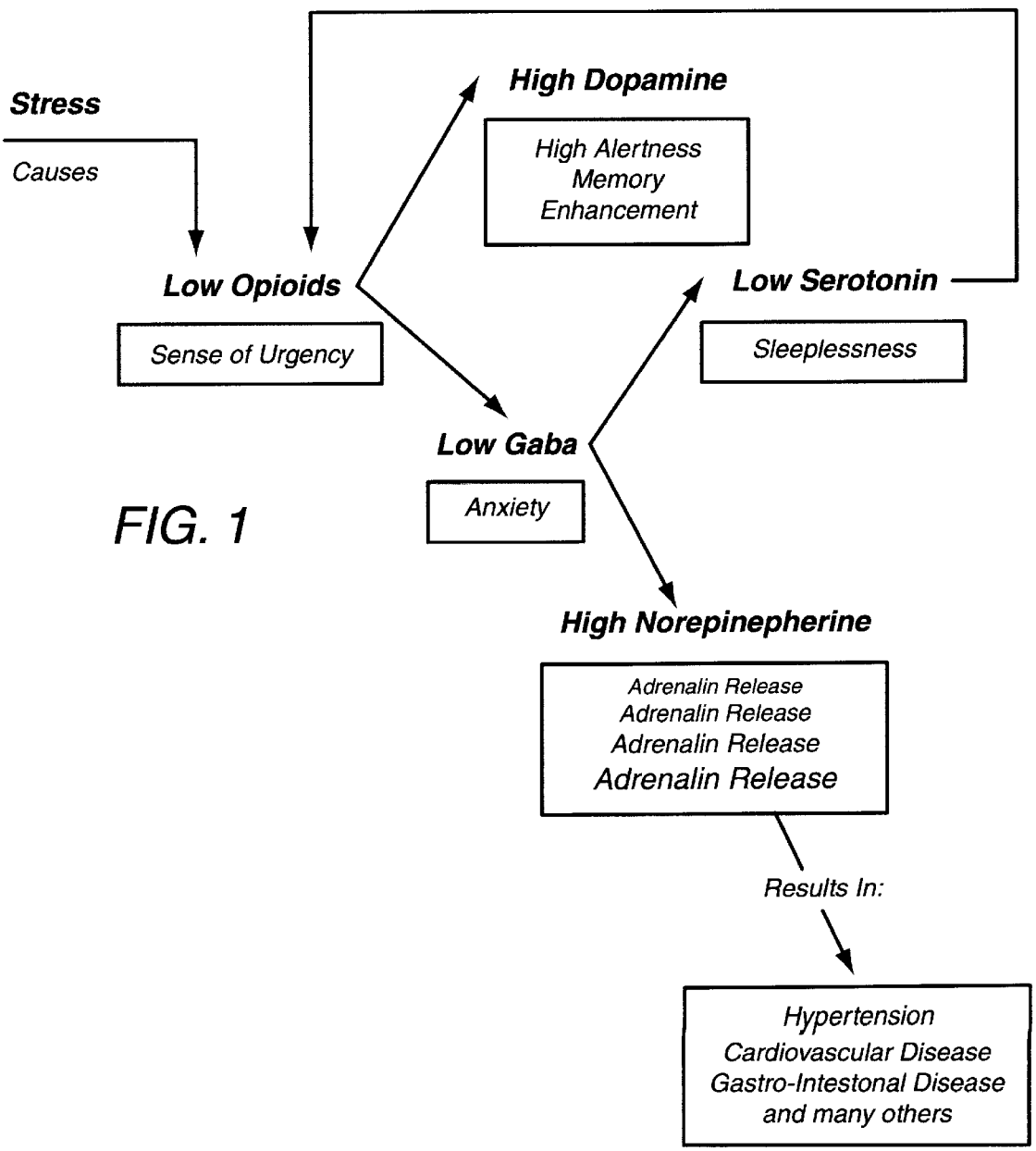
FIG. 1 depicts a schematic of a proposed cycle of interdependent events affecting dopamine production in the human body, referred to as the "stress cycle."

The food supplement compositions contemplated by the present invention have been developed based upon the teachings of Blum et al. disclosed in U.S. Pat. Nos. 4,761,429 and 5,189,064 which are incorporated herein by reference. As will be hereinafter described in detail, the present invention provides nutrition supplements which assure the human body of having sufficient neurotransmitter precursors and the like to enable assaults from stressful circumstances and conditions to be accommodated by self-regulation. Thus, as will be understood by those skilled in the art, the present invention avoids the necessity of prescribing a conventional post-stress regimen of medications or nutritional supplements administered on a p.r.n. basis. That is, the food supplement compositions taught by the present invention provide a means and method for accumulating sufficient opioid concentrations in the human body for safely coping with conditions of stress.

It has been discovered that incorporating suitable quantities of folic acid into compositions taught by Blum to inhibit breakdown of endogenous substances such as enkaphalins and endorphins, provide a reliable and cost-effective means for assuring that the human body has sufficient opioid resources to quell common stressful assaults upon its normal physiological and psychological functioning. More particularly, including a folic acid dosage of from 50–150 micrograms ($\mu$g) in embodiments of the present invention has been discovered to enable a combination of the Blum prescribed precursor ingredients comprising D-phenylalanine, DL-phenylalanine, L-phenylalanine, L-glutamine, and Vitamin $B_6$ in amounts heretofore unknown in the art. As will be hereinafter described in detail, corresponding to this preferred folic acid dosage, it has been found that a daily dosage thereof from 50–900 milligrams ("mg") provides a cofactor or coenzyme prerequisite for the stress-accommodating capabilities of the present invention. Moreover, as will be understood by those skilled in the art, this folic acid cofactor accomplishes the performance suggested by Blum et al. at surprisingly low concentrations of component precursors.

Thus, contrary to the methodology heretofore practiced in the art, wherein dosage is prescribed on a p.r.n. basis, the present invention contemplates compositions which are applicable in dosages generally administered on the basis of a patient's age. For example, U.S. Pat. No. 4,761,429 specifically states that the broad range of dosage shown in the various examples is intended to compensate for genetic variability and human specific pharmogenetic response. As an example, the dosage disclosed for D-phenylalanine ranges from 16 to 500 mg, with a daily dosage ranging from 16 to 5,000 mg. Similarly, the dosage for L-glutamine ranges from 25 to 500 mg, with a daily dosage ranging from 25 to 5,000 mg. It should be evident that the only practicable way to administer the anti-craving treatment and the like is on a patient-by-patient basis.

The present invention, on the other hand, generally teaches narrower dosage ranges. In particular, D-phenylalanine ranges from 50 to 150 mg, with a daily dosage ranging from 50 to 900 mg; DL-phenylalanine ranges from 160 to 600 mg, with a daily dosage ranging from 150 to 3,600 mg; L-phenylalanine ranges from 150 to 600 mg, with a daily dosage ranging from 150 to 3,600 mg; L-glutamine ranges from 300 to 600 mg, with a daily dosage ranging from 300 to 3,600 mg; Vitamin $B_6$ from 1 to 75 mg, with a daily dosage ranging from 1 to 450 mg.

Further comparison with the compositions contemplated by Blum in U.S. Pat. No. 5,189,064 clearly indicates that the compositions of the present invention may be effectuated on a self-regulating basis. Thus, each of the ingredients of the Blum compositions disclosed therein may vary by an order of magnitude contemplated to be from 10–1,000%. As an example of an amino acid formulation taught thereunder, the dosage disclosed for DL-phenylalanine is 250 mg, with a daily dosage of 1500 mg; the dosage disclosed for L-tyrosine is 150 mg, with a daily dosage of 900 mg. Similarly, the dosage for L-glutamine is 50 mg, with a daily dosage of 300 mg. Folic acid is included in this formulation in a dosage of 60 mg, with a daily dosage of 400 mg, to promote oxidation in the blood as a hematopoietic agent. Of course, the present invention teaches a crucial, enzymatic function for folic acid as an ingredient of food supplement compositions disclosed herein.

As is well known in the art, two significant characteristics of enzymes are high catalytic efficiency and high degree of specificity for substrates. A single enzyme may react with only a single substrate or, in some instances, may react with a particular chemical grouping of chemically related substrate. It is understood in the art that enzyme molecules are efficient vehicles for accelerating transformation of substrate to end product. For instance, a single enzyme molecule may effect the change of as many as 10,000 to 1 million molecules of substrate per minute. This ability, together with the fact that enzymes are not consumed or altered during consequent catalytic reactions, reveals why vanishingly small quantities of enzymes are sufficient for cellular processes.

Enzymes comprise proteins or proteins combined with other chemical groups. Many enzymes consist of a protein combined with a low-molecular weight organic molecule referred to as a coenzyme or cofactor. The essential component of several coenzymes has been found to be a vitamin. Several B-vitamins, including thiamine ($B_1$), riboflavin ($B_2$), niacin ($B_3$), pyridoxin ($B_6$), and folic acid have been identified as the primary components of coenzymes. As will be evident to those skilled in the art, the coenzymatic functionality of folic acid for use in Blum compositions known in the art underlies the novelty of the present invention.

In the United States, the typical daily diet contains about 0.15–0.20 mg of folic acid which includes only about 0.02 mg pteroylglutamic acid ($H_4PteGlu$). Folic acid is very sensitive to heat: 50–95% of its enzymatic activity is known to be destroyed by conventional cooking methods. As will be appreciated by those skilled in the art, the mucosae of the duodenum and the upper portion of the jejunum are rich in dihydrofolate reducstase and are capable of methylating most, if not all, of the reduced folates. Both the folic acid derived from dietary intake and from formations of the intestinal flora are actively absorbed throughout the small intestine, with large amounts thereof diffusing through the intestinal wall. Since most of this absorption occurs in the proximal portion of the small intestine, it is not unusual for folate deficiency to occur when the jejunum is diseased or severely stressed from such conditions as protracted alcohol use.

It will be appreciated that the maximum folic acid concentration in the blood serum is attained 2–4 hours after an oral dose thereof Normal blood levels of folic acid (folacin) is generally 3.4 $\mu$g/ml. Folic acid is commonly found in the liver and spleen in the form of tetrahydroptreoylglutamic acid ($H_4PteGlu$) and dihydroptreoylglutamic acid ($H_2PteGlu$). As is understood in the art, when body cells require folic acid, the liver methylates the stored tetrahydrofolic acid to produce 5-Methyltetrahydroptreoylglutamic acid ($CH_3H_4PteGlu$). The flow of $CH_3H_4PteGlu$ into the bile is regulated by the folate enterohepatic cycle, through a vitamin $B_{12}$-dependent pathway. The folate enterohepatic cycle along with the vitamin $B_{12}$-pathway may provide as much as 0.2 mg or more of methyl folate ($CH_3H_4PteGlu$) each day for recirculation to tissue. If a $B_{12}$ deficiency exists, folic acid is trapped as methyl folate and is rendered useless to the body. Animal studies have shown a rapid reduction in methyl folate in plasma following the ingestion of alcohol which interferes with the enterohepatic cycle.

There are several known causes of folic acid deficiency. First, there may be an inadequate dietary intake in infants, alcoholics, or cirrhotic patients. Second, there may be disturbances of normal intestinal absorption such as malabsorption syndrome, alcohol-induced malabsorption, resection of jejunum, or haemochromatosis. Next, there may be an increased requirement for folic acid attributable to pregnancy, chronic stress, chronic hemolytic anaemia, or cancer. There may also be disturbances of folic acid metabolism attributable to folic acid antagonists, sulphonamides, primidone, pyrimethamine, or $B_{12}$ deficiency. Folic acid antagonists like aminopterin, alcohol and substances with a structure resembling pyrimidine, e.g., primidone and pyrimethamine, inhibit tetrahydrofolate dehydrogenase and thereby inhibit formation of tetrahydrofolic acid. The biosynthesis of dihydrofolic acid is inhibited by sulphonamides.

It will be appreciated that a daily intake of 5 $\mu$g folic acid or less results in a deficiency thereof The amount of folic acid stored in the liver is not adequate to cover demands typically experienced during periods of prolonged stress, alcoholism, pregnancy, lactation during ingestion of some medications including aspirin, Tagamet, and oral contraceptives. It has been observed in the art that polyglumate absorption is reduced by as much as 50% in women taking birth control pills, thereby lowering folic acid availability. It has also been observed in the art that depressed levels of folic acid, e.g., less than 0.7–1.6 $\mu$g/100 ml, will result in depressed serum level in two weeks. Excessive segmentation of leucocytes will occur in six to ten weeks. Erthrocyte and liver stores are depleted within twelve weeks and formiminoglutamate, urocanate, formate and aminoimidazole carboxyamide urinary excretions increases. At eighteen weeks, symptoms of macroelliptocytosis become apparent. After nineteen weeks, evidence of megaloblastosis of the bone marrow becomes evident. A deficiency of folic acid for a duration of twenty weeks or longer has been observed to result in macrocytic anemia. It is also known in the art that continual alcohol consumption can produce a deficient of folic acid in twenty four to forty eight hours, and produce megaloblastic erythropoiesis in ten to twelve weeks. It has been observed in the art that alcoholics are apt to develop a folic acid deficiency ten times faster, and are apt to suffer from megaloblastic erythropoiesis two times faster, than non-alcoholics.

Furthermore, folic acid deficiency is a common cause of megaloblastic anaemia during pregnancy, due to a lack of 5,10-methylenetetrahydrofolic acid required for the synthesis of pyridines and purine for DNA production. In addition, it has been found that women who suffer from a deficiency of folic acid are at risk of having babies with neural tube defects including failure of the brain to fully develop and failure of the spinal column to close (spinal bifida). In the United States, the recommended daily allowance (RDA) of folic acid is 100–700 $\mu$g per day. Folic acid is a fail-safe ingredient of food supplements and the like: it has a low toxicity. A one-thousand fold increase in daily requirement may be consumed with no harmful effects: excessive folic acid is routinely excreted in the urine.

Tetrahydrofolic acid or tetrahydropteroylglutamic acid ($H_4PteGlu$) is an important carrier of one carbon unit via the methyl group. $H_4PteGlu$ is responsible for the methylation of choline, methionine, serine (requires $B_6$), histidine and nicotinamide (requires $B_3$)to N1-methylnicotinamide, and also in the synthesis of purines. Based upon the importance of $H_4PteGlu$ for purine and nucleic acid synthesis, it should be clear to those skilled in the art that folic acid is essential to all processes of cell division, particularly in haemopoiesis (stimulation of the reticulocytes).

According to the present invention, properly combining precursor substrates and the like with folic acid, converts L-homocysteine to L-methionine, thereby producing methionine in sufficient quantity to, in turn, produce a sufficient quantity of met-enkephalin. As will be appreciated by those conversant with the art, sufficient met-enkephalin enables the enkephalins to accumulate within the hypothalamus, thereby increasing the levels of endogenous opioids.

Figure 2:
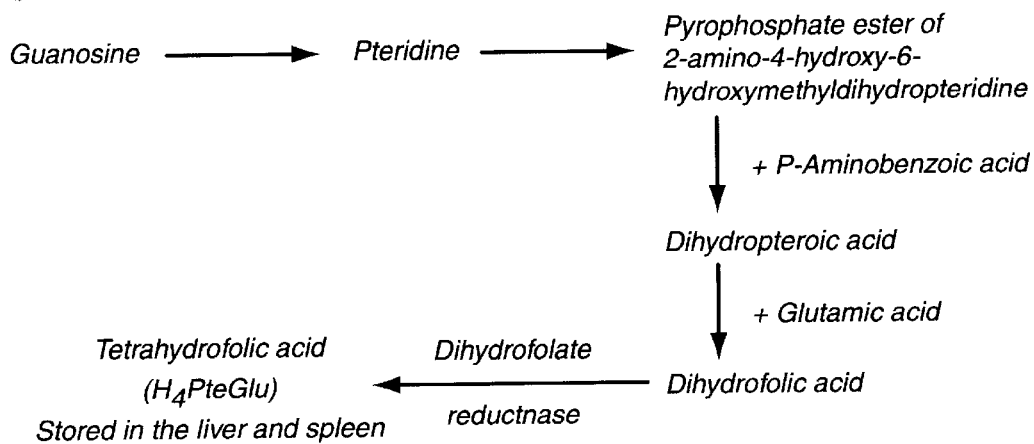
FIG. 2 depicts a schematic of folic acid synthesis from higher plants, intestinal flora, and animal tissues.

As depicted in FIG. 2, folic acid is synthesized by higher plants, intestinal flora and in animal tissues by the pathway from guano sine to pteridine to pyrophosphate ester of 2-amino-4-hydroxy-6-hydroxymethydihydropteridine. The latter, in turn, reacts with p-aminobenzoic acid to yield dihydropteroic acid, which then reacts with glutamic acid to yield dihydrofolic acid. This then reacts catalytically with dihydrofolate reductace to yield tetrahydrofolic acid ($H_4PteGlu$) which is stored in the liver and spleen.

Folic acid taken orally as a dietary supplement is absorbed in the small intestine and is stored in the liver by the folate enterohepatic system. When the cells of the body require folic acid, the liver methylates the stored tetrahydrofolic acid to produce 5-methyltetrahydroptreoglutamic acid ($CH_3H_4PteGlu$), which is released to the blood stream through the bile. In the blood stream the transport of $CH_3H_4PteGlu$ into individual cells is regulated by receptor-mediated endocytosis.

Figure 3:
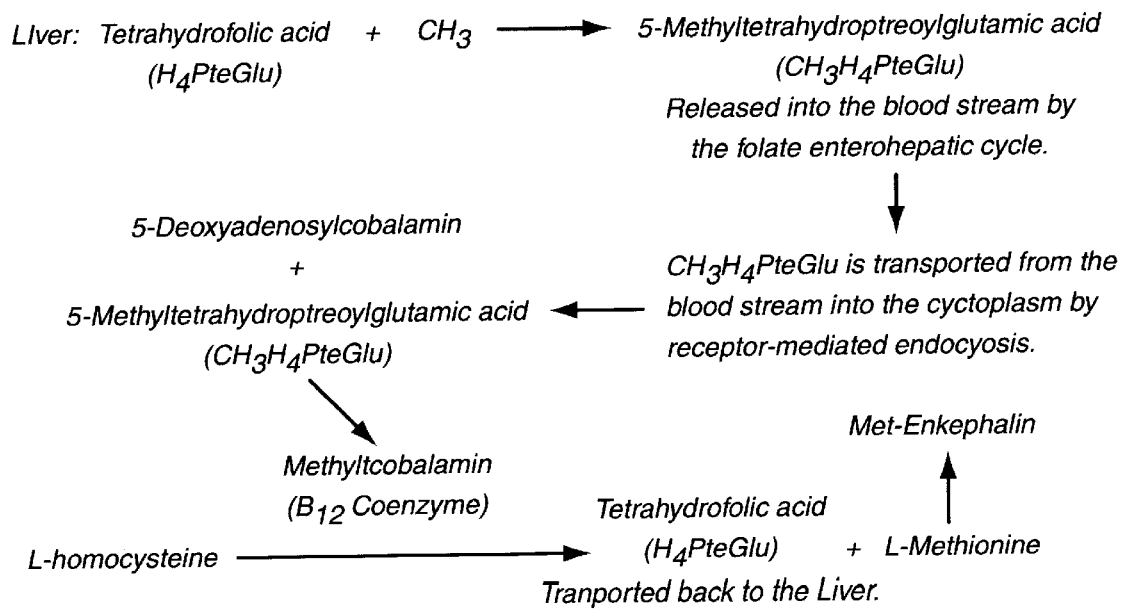
FIG. 3 depicts a schematic of met-enkephalin synthesis in the cell.

It will be understood that, in the cell, methylcobalamin ($B_{12}$ coenzyme) is produced by combining 5-deoxyadenosylcobalamin and 5-Methyltetrahydrofolic acid. With the addition of the enzyme, 5-Methyltetrahydrofolate homocysteine transferase, L-homocystiene is converted to L-methionine. This synthesis is shown schematically in FIG. 3.

Hence, unlike the prior art, the present invention teaches a precursor composition that incorporates folic acid therein in order to effectively coordinate the effect of methionine and the Blum ensemble of phenylalanine components to yield met-enkaphalin by the body's self-regulation faculties. This approach, of course, wherein the human body essentially produces prerequisite enkephalin to ward off stressful assaults and the like is readily distinguished from the approach taught by Blum in U.S. Pat. Nos. 4,761,429 and 5,189,064 incorporated herein by reference, wherein endorhinase and enkaphalinase inhibitors are applied on a p.r.n. basis.

In the formulation contemplated under the present invention, D-phenylalanine dose ranges from 50–150 mg; with a daily dosage range of 50–900 mg; DL-phenylalanine dose ranges from 150–600 mg with a daily dosage range of 150–3600 mg; L-phenylalanine dose ranges from 150–600 mg, with a daily dosage of 150–3600 mg; L-glutamine dose ranges from 300–600 mg, with a daily dosage of 300–3600 mg; vitamin $B_6$ dose ranges from 1–75 mg, with a daily dosage of 1–450 mg; folic acid dose ranges from 50–150 µg, with a daily dosage of 50–900 µg.

It will be appreciated by those skilled in the art that the additional supplementation of vitamin $B_{12}$ is not required for the methylation mechanism of homocysteine to methionine because the cumulative $B_{12}$ storage capacity of the body is 2–5 mg, with a range of 1–11 mg; the liver contains about .8 mg $B_{12}$ (the biological half-life of the $B_{12}$ in the liver is 12 months): only 0.1% of the body's $B_{12}$ capacity is excreted daily; the body's $B_{12}$ storage capacity is sufficient to prevent a deficiency for a three to eight year time frame; and the temporary increase in the metabolic rate associated with $B_{12}$ supplementation counters some of the benefits derived in the stress cycle.

It will be appreciated that the formulation of substrates taught by the present invention provide precursor loading for several pathways in the hypothalamus. These pathways include conversion of L-phenylalanine to tyrosine by the action of 2-phenylethlamine, thereby providing available tyrosine for the formation of met-enkephalin in the body on an as-needed basis; similarly, L-phenylalanine is available for the formation of met-enkephalin. Additionally, the methylation of L-homocysteine by the mechanism hereinbefore described provides available L-methionine for the formation of met-enkepahlin; and conversion of L-phenylalanine to dopamine and norepinephrine through the tyrosine/dopa pathway.

It will be understood by those skilled in the art that an additional benefit derived from the conversion of L-homocysteine to L-methionine is that adverse effects caused by homocysteine are eliminated. Homocysteine, indeed, appears to cause damage to most body systems. Elevated homocysteine levels (hyperhomocysteinemia) have been implicated in several disease states. For example, hyperhomocysteinemia is a risk factor for heart disease, and has been associated with increased incidences of neural tube birth defects. Hyperhomocysteinemia has also been observed in patients with central nervous system disorders, such as schizophrenia, depression, and certain cases of mental retardation.

During the past fifteen years, reports in the art have suggested that one of the brain's biochemical pathways contributing to affective behavior disorders (depression) is related to the activation of the methylation process. This activation results in the alteration of normal brain chemistry. As hereinbefore described, the nutrients that are crucial to the methylation pathway include folic acid, methionine, vitamin $B_6$ and vitamin $B_{12}$. Another substance involved in the control of methyl groups is the intermediate compound S-adenosylmethionine. Trials performed during the 1980's in the art suggest that S-adenosylmethionine has antidepressant properties and is as effective for treating depression as many standard antidepressant medications.

The brain's biochemical pathways contributing to affective behavior disorders (depression) is only partially related to the activation of the methylation process. The complete mechanism of these disorders is found in how the brain reacts to stress. In the stress cycle, stress causes the opioid levels to drop, causing a sense of urgency. The dropping of the opioids forces dopamine to increase and GABA to decrease. The combined effect produces a combination of alertness and anxiety. The drop in GABA causes norepinephrine release to increase, which causes adrenaline to be released and serotonin to decrease. This causes a low anger threshold to develop, with the inability to sleep. The drop in serotonin further modulates the opioids even lower. The cycle therefore repeats with continually increasing intensity. As will be appreciated by those skilled in the art, an unstable physiological or unstable psychological condition ultimately results.

Figure 4:
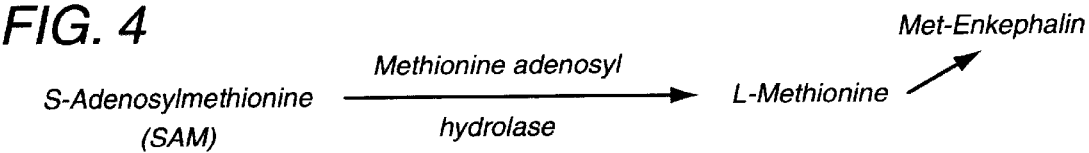
FIG. 4 depicts a schematic of the conversion of S-adenosylmethionine into L-methionine by methionine adenosyl hydrolase.

S-adenosylmethionine effectiveness as an antidepressant medication is not found in its ability to control methylation, as was thought in the 1980's, but in its ability to be converted back into L-methionine by methionine adenosyl hydrolase as shown schematically in FIG. 4. Whether folic acid is increased in the diet or s-adenosylmethionine is administered, the net result is an increase in available L-methionine. This increase of methionine will be in sufficient supply to, in turn, produce sufficient met-enkephalin, thereby enabling accumulation of enkephalins to within the hypothalamus. As will be understood by those skilled in the art, this ready supply of enkephalins enables the body to produce increased levels of endogenous opioids when required to break the adverse cyclical effects manifest by the stress cycle (see FIG. 1).

Thus, it is an advantage and feature of the present invention that supplementation of the human body's precursors for producing a sufficient supply of enkaphalins stored in the hypothalamus is provided. In particular, the compositions taught by the present invention are shown in Table 1.

TABLE 1

| Component | Preferred | More Preferred | Most Preferred |
|---|---|---|---|
| Folic Acid | 0.05–0.15 mg | 0.09–0.11 mg | 0.1 mg |
| L-Phenylalanine | 50–100 mg | 65–80 mg | 75 mg |
| D/L-Phenylalanine | 100–300 mg | 135–165 mg | 150 mg |
| L-Glutamine | 150–300 mg | 200–250 mg | 225 mg |
| L-Tryptophan | 50–125 mg | 65–85 mg | 75 mg |
| Vitamin A (Beta Carotine) | 500–2000 IU | 750–1500 IU | 1000 IU |
| Vitamin $B_6$ | 0.5–2 mg | 0.75–1.5 mg | 1 mg |

These embodiments, when prepared in accordance with formulation blending and manufacturing techniques well known in the art, consistently produce food supplement compositions that provide advantageous stress relief reinforcements for the human body as herein before described. Indeed, as will be understood to those skilled in the art, these compositions provide the nutritional precursors that enable the human body to produce prerequisite methionine so that, in turn, an adequate accumulation of enkephalins within the hypothalamus is achieved, wherein the adversity engendered under the influence of the mechanics of the stress cycle may be readily exploited to prevent perturbation from equilibrium. It should be evident that, because of the cyclic nature of the manner in which the human body copes with stressful invasion, a small improvement in each step of the loop will nonetheless engender a significant impact upon the body's overall defenses to stress because of the cumulative effect of each stepwise improvement.

Compositions also contemplated by the present invention are shown in Table 2, wherein a tripartite subcomposition comprising calcium, magnesium, and chromium picolinate, is substituted for L-tryptophan. As will be appreciated by those skilled in the art, the Food And Drug Administration has severly limited the applicability of tryptophan in compositions contemplated by the present invention. It has been found that such substitution may be made without detracting from the panoply of stress-relief benefits taught herein.

TABLE 2

| Component | Preferred | More Preferred | Most Preferred |
|---|---|---|---|
| Folic Acid | 0.05–0.15 mg | 0.09–0.11 mg | 0.1 mg |
| L-Phenylalanine | 50–100 mg | 65–80 mg | 75 mg |
| D/L-Phenylalanine | 100–300 mg | 135–165 mg | 150 mg |
| L-Glutamine | 150–300 mg | 200–250 mg | 225 mg |
| Calcium | 25–100 mg | 45–55 mg | 50 mg |
| Magnesium | 12–50 mg | 22–28 mg | 25 mg |
| Chromium Picolinate | 0.005–0.02 mg | 0.007–0.015 mg | 0.01 mg |
| Vitamin A (Beta Carotine) | 500–2000 IU | 750–1500 IU | 1000 IU |
| Vitamin $B_6$ | 0.5–2 mg | 0.75–1.5 mg | 1 mg |

The typical dosage of the present invention to afford the human body to self-regulate its defenses to stressful attacks and the like depends generally, of course, upon the age of the patient. For example, for 3 year old patients, a dosage of up to ½ capsule would be recommended; for 4 or 5 year old patients, a dosage of up to 1 capsule would be recommended; for 6 or 7 year old patients, a dosage of up to 2 capsules would be recommended; for 8 or 9 year old patients, a dosage of up to 3 capsules would be recommended. By simply extending these recommended dosages, for a 16 year old or an adult, a dosage of up to 6 capsules would be recommended. It will be appreciated that the present invention provides fail-safe compositions since all of the ingredients incorporated therein are water-soluble. The exception, of course, is vitamin A which is readily removed in the urine.

Since the largest size capsule that most children are willing to swallow is a single-ought ("0") and since most adults have difficulty swallowing a double-ought ("00") size capsule, a single ought capsule can hold only about 650 mg of amino acids or metals. If one of the component ingredients is present in a higher concentration than depicted in the "most preferred" column shown in Table 1 or 2, then another component must be reduced by a like amount. Under the present invention, the Blum preferred formulation consisting of 400 mg of DL-phenylalanine and 100 mg L-glutamine would be improved with the addition of folic acid as hereinbefore described in detail. As appreciated by those skilled in the art, fortunately, incorporating folic acid into compositions taught herein enables such DL-phenylalanine to be significantly reduced because enkephalinase inhibition is no longer necessary. The corresponding increased concentrations of L-phenylalanine and L-glutamine are easily accommodated in the encapsulation of the preferred formulation wherein stress cycle effects are assuaged as hereinbefore described in detail.

It is an advantage and feature of the present invention that less costly compositions may be prepared than otherwise has been available in the art. As has been hereinbefore described, not only are lower concentrations of such costly ingredients as DL-phenylalanine and D-phenylalanine required under the present invention, but also prohibitively expensive ingredients such as methionine are not required. Although costs of these ingredients vary according to market conditions, a typical range for DL-phenylalanine is $60–$100 per kilogram ("kg"); for D-phenylalanine is $200–$300 per kg; for L-methionine is $500–$1,000 per kg. Of course, as will be readily understood by those conversant in the art, the compositions taught by Blum did not include L-methionine because of the prohibitive price thereof The impact of the breadth of benefits obtained by adopting a nutritional regimen incorporating the present invention may be easily understood by viewing the intertwined steps comprising the stress cycle depicted in FIG. 1. It is believed that the methodology taught by the present invention, wherein the human body is given the resources to self-regulate its available supply of endogenous opioids, affords a surprisingly effective and inexpensive manner in which to mitigate the impact of frequent stressful assaults. It should be clear that such an approach to provide ample precursors to enable supplementing the body's ability to manufacture prerequisite met-ekaphalins and the like is hereinbefore unknown in the art.

Other variations and modifications will, of course, become apparent from a consideration of the specific embodiment and illustrative examples hereinbefore described. Accordingly, it should be clearly understood that the present invention is not intended to be limited by the particular disclosure, embodiment and examples hereinbefore described and depicted in the accompanying drawings, but that the concept of the present invention is to measured by the scope of the appended claims herein.

What is claimed is:

1. A method for enabling the human body to mitigate stressful assaults upon its physiological and psychological equilibrium by administering a food supplement comprising a neurotransmitter precursor substrate and coenzyme folic acid for producing sufficient met-enkaphalin in the hypothalamus for self-regulating release of endogenous opioids.

2. The method of claim 1, wherein said neurotransmitter precursor substrate consists of L-phenylalanine; DL-phenylalanine; L-glutamine; and L-trytophan.

3. The method of claim 1, wherein said neurotransmitter precursor substrate consists of L-phenylalanine; DL-phenylalanine; L-glutamine; and a combination of calcium, magnesium, and chromium picolinate.

* * * * *